United States Patent
McEwan

(10) Patent No.: US 8,484,844 B2
(45) Date of Patent: *Jul. 16, 2013

(54) METHOD OF MANUFACTURING A CONNECTING ROD ASSEMBLY FOR AN INTERNAL COMBUSTION ENGINE

(75) Inventor: Alan Stephen McEwan, South Lyon, MI (US)

(73) Assignee: MAHLE Industries, Incorporated, Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,397

(22) Filed: Nov. 15, 2011

(65) Prior Publication Data

US 2012/0055019 A1   Mar. 8, 2012

Related U.S. Application Data

(62) Division of application No. 12/356,110, filed on Jan. 20, 2009, now Pat. No. 8,079,145, which is a division of application No. 10/989,633, filed on Nov. 16, 2004, now Pat. No. 7,581,315.

(51) Int. Cl.
*B21D 53/84* (2006.01)
*F02B 75/32* (2006.01)

(52) U.S. Cl.
USPC ....... 29/888.09; 29/447; 29/557; 29/888.091; 74/579 R; 123/197.3

(58) Field of Classification Search
USPC .......... 29/888.05, 888.051, 888.09, 888.091, 29/888.092, 447, 557; 74/579 R; 92/157; 123/197.3

See application file for complete search history.

(56) References Cited

U.S. PATENT DOCUMENTS

| | | | |
|---|---|---|---|
| 448,766 A | 3/1891 | Kelliher |
| 491,974 A | 2/1893 | Barler |
| 1,491,155 A | 4/1924 | McKone |
| 1,959,279 A | 5/1934 | Stearns |
| 2,202,773 A | 5/1940 | Given |
| 3,479,929 A | 11/1969 | Fangman |
| 3,935,797 A | 2/1976 | Niimi et al. |
| 3,971,355 A | 7/1976 | Kottmann |
| 4,233,088 A | 11/1980 | Kronstein |
| 4,388,523 A | 6/1983 | Keep, Jr. et al. |
| 4,430,906 A | 2/1984 | Holtzberg et al. |
| 4,709,620 A | 12/1987 | Mielke |
| 4,863,513 A | 9/1989 | Umeha et al. |
| 4,974,498 A | 12/1990 | Lemelson |
| 4,984,544 A | 1/1991 | DeBiasse |
| 5,039,285 A | 8/1991 | Lindstrom |

(Continued)

*Primary Examiner* — Alexander P Taousakis
(74) *Attorney, Agent, or Firm* — Bliss McGlynn, P.C.

(57) ABSTRACT

A method of manufacturing a connecting rod assembly including the steps of defining a small end of a connecting rod assembly having a terminal end and then defining a pin bore extending through the small end of the connecting rod assembly. A pair of channels is formed on opposite sides of the small end of the connecting rod assembly wherein the axis of each of the channels is substantially perpendicular to the axis of the pin bore. A bushing having a contact surface including at least partially annular grooves disposed thereon is installed into the pin bore of the small end. The connecting rod is then machined to reduce the width of the small end between each channel and the terminal end wherein at least a portion of the grooves are disposed along the distal ends to reduce the need to deburr the area adjacent to the pin bore.

7 Claims, 4 Drawing Sheets

U.S. PATENT DOCUMENTS

| | | | |
|---|---|---|---|
| 5,081,967 A | 1/1992 | Kemnitz et al. | |
| 5,158,695 A | 10/1992 | Yashchenko et al. | |
| 5,257,603 A | 11/1993 | Bauer et al. | |
| 5,352,541 A | 10/1994 | Tanaka et al. | |
| 5,544,413 A * | 8/1996 | Stevens et al. | 29/888.092 |
| 5,549,034 A | 8/1996 | Loughlin | |
| 5,592,927 A | 1/1997 | Zaluzec et al. | |
| 5,613,182 A | 3/1997 | Lynn | |
| 5,661,904 A | 9/1997 | Loughlin | |
| 5,772,801 A | 6/1998 | Baldi et al. | |
| 5,836,280 A | 11/1998 | Miyazawa | |
| 5,878,323 A | 3/1999 | Sakai et al. | |
| 5,878,491 A | 3/1999 | Morgen et al. | |
| 6,134,779 A | 10/2000 | Walker et al. | |
| RE37,565 E | 3/2002 | Bubeck | |
| 6,357,918 B1 | 3/2002 | Kagohara et al. | |
| 6,422,755 B1 | 7/2002 | Cadle et al. | |
| 6,427,326 B1 | 8/2002 | Soga et al. | |
| 6,446,436 B1 | 9/2002 | Winkelmann et al. | |
| 6,491,013 B1 | 12/2002 | Gaiser et al. | |
| 6,497,771 B1 | 12/2002 | Schubach et al. | |
| 6,513,477 B1 | 2/2003 | Gaiser et al. | |
| 6,539,910 B1 | 4/2003 | Gaiser et al. | |
| 6,540,403 B1 | 4/2003 | Damour | |
| 6,557,457 B1 | 5/2003 | Hart et al. | |
| 6,579,492 B2 | 6/2003 | Wehler | |
| 6,640,779 B1 | 11/2003 | Thiyagarajan | |
| 6,769,518 B2 | 8/2004 | Uehara et al. | |
| 8,245,687 B2 * | 8/2012 | Lapp et al. | 123/197.3 |
| 2005/0155451 A1 | 7/2005 | Abelm et al. | |
| 2005/0160597 A1 | 7/2005 | Hase | |
| 2010/0300397 A1 * | 12/2010 | Lapp et al. | 123/197.3 |

* cited by examiner

METHOD OF MANUFACTURING A CONNECTING ROD ASSEMBLY FOR AN INTERNAL COMBUSTION ENGINE

CROSS-REFERENCE TO RELATED APPLICATIONS

This application is a divisional of U.S. Ser. No. 12/356,110, which issued into U.S. Pat. No. 8,079,145, entitled "Method of Manufacturing a Connecting Rod Assembly for an Internal Combustion Engine" filed Jan. 20, 2009, which is a divisional of U.S. Ser. No. 10/989,633, which issued into U.S. Pat. No. 7,581,315, entitled "Connecting Rod Assembly for an Internal Combustion Engine and Method of Manufacturing Same" filed Nov. 16, 2004.

BACKGROUND OF THE INVENTION

1. Field of the Invention

The present invention relates, generally, to connecting rod assemblies and, more specifically, to a method of manufacturing a connecting rod assembly for an internal combustion engine.

2. Description of the Related Art

Internal combustion engines known in the related art may generally include, among other basic components, an engine block having one or more cylinders, cylinder heads associated with the engine block, pistons supported for reciprocal movement in each cylinder, and connecting rod assemblies to transfer the movement of the pistons to the crankshaft. The piston generally includes a bore that corresponds to a similar pin bore at one end of the connecting rod assembly. A pin is placed through the corresponding bores to attach the piston to the connecting rod assembly. The end of a connecting rod assembly having the pin bore is commonly referred to as the "small end." The other end of a connecting rod assembly is fastened to the crankshaft at a particular location. This end of the connecting rod assembly is commonly referred to as the "crank end" or "large end."

Generally, fuel is combusted within the cylinders to reciprocate the pistons. The piston drives the connecting rod assembly, which drives the crankshaft, causing it to rotate within the engine block. Specifically, as fuel is combusted within the cylinder, the combustion pressure drives the piston downward in a substantially linear motion, which in turn drives the connecting rod assembly in a substantially linear, but slightly rotational motion. On the other hand, the large end of the connecting rod assembly is attached to the crankshaft, which drives the large end of the connecting rod assembly in a substantially rotational motion.

Since it is the connecting rod assembly that transfers the reciprocal motion of the piston into the rotational motion of the crankshaft, the connecting rod assembly incurs a high level of stress at both the large end and small end pivot points. At the small end, the lower surface of the pivot point has to resist a high load from the transfer of the combustion pressure from the piston pin down through the connecting rod. The upper surface of the connecting rod at the small end has to resist a much lower load, which is the result of inertia force from the reciprocating masses during the exhaust stroke.

To optimize efficiency in this location, the small end of the connecting rod assembly may be manufactured to have a reduced width at the upper region with respect to the remaining portion of the small end. One type of connecting rod assembly that has a reduced width small end is commonly referred to as a "stepped" connecting rod assembly. Specifically, the reduced width small end of a connecting rod assembly permits a wider bearing area in the piston and increases the overall load carrying capability while minimizing the overall weight of the piston and connecting rod assembly.

However, in order to provide a stepped connecting rod assembly, a portion of the small end between the pin bore and the upper region is removed by a machining process. The machining process generates burrs along the edges, such as around the pin bore, which must be removed prior to assembling the connecting rod assembly to the piston. The deburring imposes an additional step in the manufacturing process that is costly and labor-intensive. Yet, without the deburring process, excess material along the small end may prevent proper assembly of the connecting rod assembly to the piston pin or other components of the engine. Additionally, the excess material may fragment from the connecting rod assembly during engine operation, which can cause engine failure.

In addition to providing a stepped configuration to facilitate load carrying capacity and seizure resistance, connecting rod assemblies may also employ a bushing within the pin bore of the small end to accomplish a similar objective. A bushing at this location is often constructed from a dissimilar material to that of the connecting rod assembly to reduce friction and provide smooth angular movement along the pivot point, thereby reducing scuffing which can cause engine damage. As a result, it is often desirous to employ a bushing at the small end of the connecting rod assembly. However, the addition of a bushing within the small end does not eliminate the need for the small end to undergo a deburring process after machining to provide a reduced width configuration.

Furthermore, moment forces are generated during installation of a bushing at the small end of a connecting rod assembly where the upper region of the small end has a reduced width with respect to the remaining portion of the small end. Specifically, during installation, the non-planar area around the pin bore of the stepped small end causes the bushing to shift in a manner where the bushing is no longer parallel with the pin bore. This can result in misalignment between the bushing and pin bore or deformation of the bushing, creating irregular contact between the bushing and the pin bore, which may lead to premature bushing failure. Additionally, this misalignment can translate to an irregular bushing surface that contacts the piston pin, which may promote scuffing and lead to engine damage.

Moment forces are also generated during the machining of the surface within the pin bore of the small end of a connecting rod assembly that contacts a piston pin. This is especially true where the connecting rod assembly has a stepped small end whether or not a bushing is employed within the pin bore. Specifically, the non-planar area around the pin bore of the stepped small end may permit the machining tool to shift while it is cutting and defining the contact surface. This shift has a tendency to create a concave lower surface, which reduces optimum efficiency at this pivot point. The creation of such a non-uniform contact surface may lead to premature failure of the pivot point between the contact surface and the piston pin, which can lead to engine damage.

The irregularities caused by the moment forces associated with installing a bushing in the pin bore of stepped small end of a connecting rod assembly as well as those associated with machining the contact surface in the pin bore are detrimental to the efficiency and cost-effectiveness of manufacturing connecting rod assemblies. Notably, these irregularities impose additional steps in the manufacturing process to inspect connecting rod assemblies and correct the irregularities where appropriate, which increases costs associated with additional labor, additional machining and lost manufacturing. Further, these irregularities can cause an out-of-tolerance condition, rendering the entire connecting rod assembly unusable.

As a result, there is an ongoing need in the art to improve connecting rod assemblies and the method of manufacturing connecting rod assemblies, in general. Specifically, there is an ongoing need to streamline the manufacturing process while retaining strength and acceptable product life of connecting rod assemblies having a stepped small end. Thus, there continues to be a need in the art for a method of manufacturing a connecting rod assembly that essentially eliminates the deburring process at the small end. Further, there is a need in the art to provide a method of manufacturing a connecting rod assembly that essentially eliminates moment forces that occur when the bushing is installed within the pin bore of a stepped small end of a connecting rod assembly as well as the moment forces that occur when a contact surface is machined in the stepped small end of a connecting rod assembly.

SUMMARY OF THE INVENTION

The present invention overcomes the disadvantages in the related art in a method of manufacturing a connecting rod assembly for use with an internal combustion engine. The method includes the steps of compressing metal powder within a die cavity defining the predetermined form, sintering the compressed the powder to bond and conform to the predetermined form of the die cavity such that the metal powder is shaped into a connecting rod and removing the connecting rod from the mold cavity. In addition, the method also includes the steps of defining a pin bore extending through the small end of the connecting rod and forming a pair of channels on opposite sides of the small end of the connecting rod wherein the axis of each of the channels is substantially perpendicular to the axis of the pin bore. A bushing is formed having a contact surface including at least partially annular grooves disposed thereon and opposed distal ends. A bushing is installed into the pin bore of the small end. In addition, the connecting rod is machined to reduce the width of the small end between each channel and the terminal end wherein at least a portion of the grooves are disposed along the distal ends to reduce the need to deburr the area adjacent to the pin bore.

Accordingly, one advantage of the present invention is it streamlines manufacturing by essentially eliminating the need for a deburring process after the small end of the connecting rod is machined to a reduced width configuration.

Still another advantage of the present invention is that it reduces the moment forces generated when installing a bushing into a pin bore of a stepped small end of a connecting rod, thereby reducing the likelihood of deforming the bushing and creating an irregular contact area between the bushing as well as the pin bore and the bushing and the piston pin.

Still another advantage of the present invention is that it reduces the moment forces generated when defining a contact surface within the pin bore of a stepped small end of a connecting rod assembly that receives a piston pin, thereby reducing the likelihood of deforming the distal ends of the contact surface and creating an irregular pivot point between the contact surface and the piston pin.

Still another advantage of the present invention is that it streamlines the manufacture of a connecting rod assembly by reducing the need for inspecting and correcting irregularities caused by moment forces generated during installation of a bushing.

Still another advantage of the present invention is that it streamlines the manufacture of a connecting rod assembly and connecting rod assembly by reducing the need for inspecting and correcting irregularities caused by moment forces generated during machining to define a contact surface within the small end that engages a piston pin.

Other objects, features, and advantages of the present invention will be readily appreciated, as the same becomes better understood, after reading the subsequent description taken in conjunction with the accompanying drawings.

DETAILED DESCRIPTION OF THE INVENTION

Figure 1:
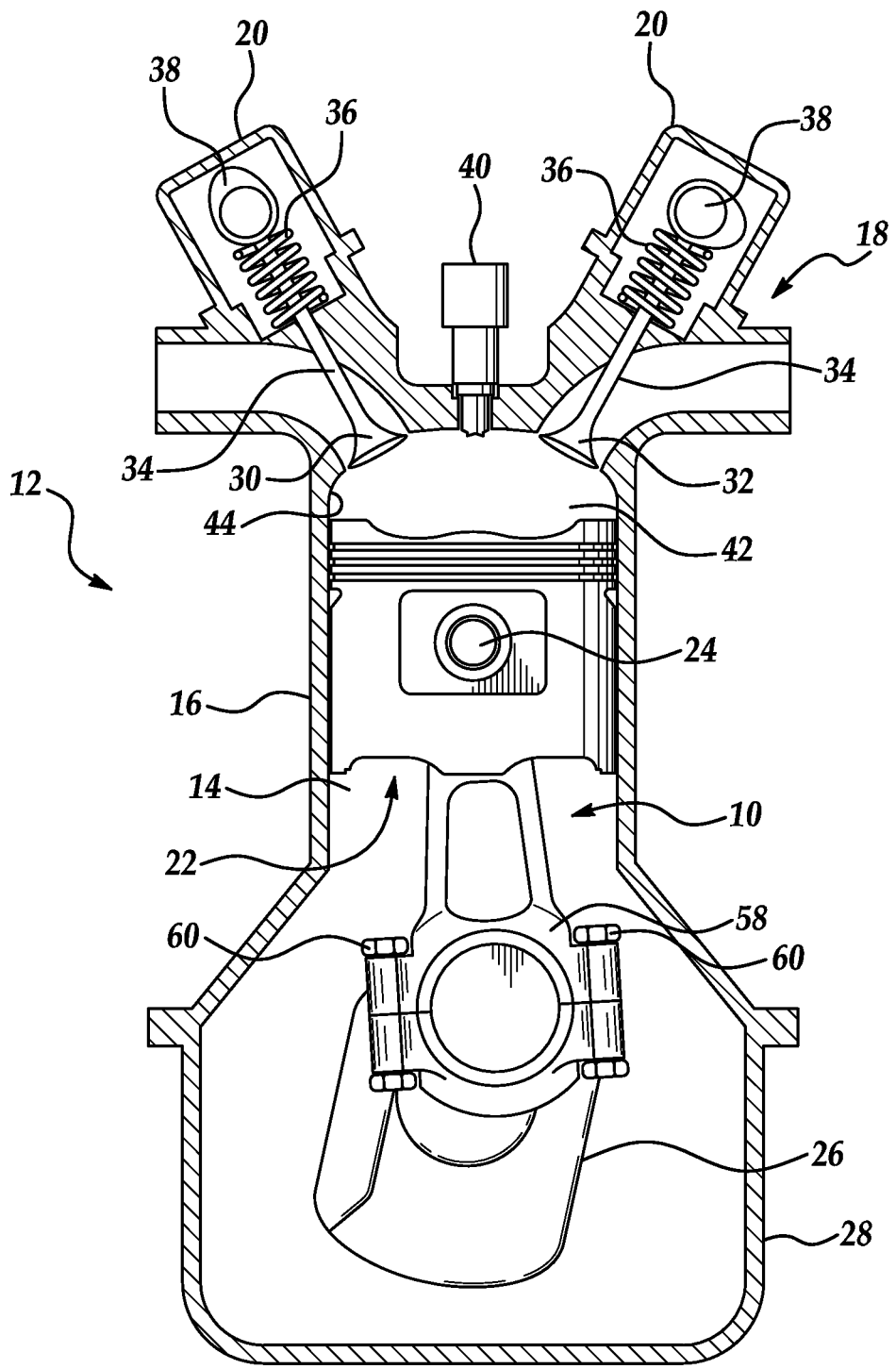
FIG. 1 is a cross-sectional environmental view of an internal combustion engine including a connecting rod assembly manufactured pursuant to the method of the present invention.

A connecting rod assembly manufactured pursuant to the method of the present invention is generally indicated at 10 throughout the figures, where like numbers are used to designate like structures throughout the drawings. As shown in FIG. 1, the present invention is particularly adapted for use in an internal combustion engine, generally indicated at 12. In this case, the assembly 10 of the present invention is illustrated in connection with a single cylinder 14 of an internal combustion engine 12 having a dual-overhead cam arrangement. Those having ordinary skill in the art will appreciate that the engine 12 is but one of the many internal combustion engines with which the present invention may be employed. By way of example, the present invention may be employed to manufacture a connecting rod assembly used in a two-stroke or four-stroke engine. The cylinders may be arranged in an in-line, v-shaped, or flat manner or in any other manner commonly known in the art. The present invention may also be employed with a carbureted or fuel injected internal combustion engine having single or dual overhead or undermounted cam(s).

With continuing reference to FIG. 1, the internal combustion engine 12 includes an engine block 16 having one or more cylinders 14, and a cylinder head generally indicated at 18 associated with the engine block 16. Rocker panels 20 are associated with the cylinder head 18 in a manner commonly known in the art. A piston, generally indicated at 22, is supported for reciprocal movement in a cylinder 14. The connecting rod assembly 10 is secured to the piston 22 through a piston pin 24 as will be explained in greater detail below. A crankshaft 26 is associated with the connecting rod assembly 10 and an oil pan 28 is associated with the engine block 16. An intake valve 30 and an exhaust valve 32, each having valve stems 34 and valve springs 36 are supported in the cylinder head 18 and are opened and closed via cams 38 to provide fluid communication between the cylinder 14 and the intake valve 30 and the exhaust valve 32. The internal combustion engine 12 also includes a spark plug 40 for igniting the fuel within the combustion chamber 42 defined by the cylinder walls 44 and above the piston 22. Alternatively, or in addition, the engine 12 may include a fuel injector (not shown) as a means of introducing atomized fuel into the combustion chamber 42. Thus, the present invention may be employed in connection with both a spark ignition or compression ignition (diesel) engine. Those having ordinary skill in the art will appreciate that the engine 12 also includes a number of other conventional components that are commonly known in the art and that will not be described in detail here.

Generally, fuel is combusted within the combustion chamber 42 of a cylinder 14 to reciprocate the piston 22. The piston 22 drives the connecting rod assembly 10, which drives the crankshaft 26, causing it to rotate within the engine block 16. Specifically, the combustion pressure within the cylinder 14 drives the piston 22 downward in a substantially linear, but slightly rotational motion. On the other hand, movement of the crankshaft 26 drives the connecting rod assembly 10 in a substantially rotational motion.

Figure 2:
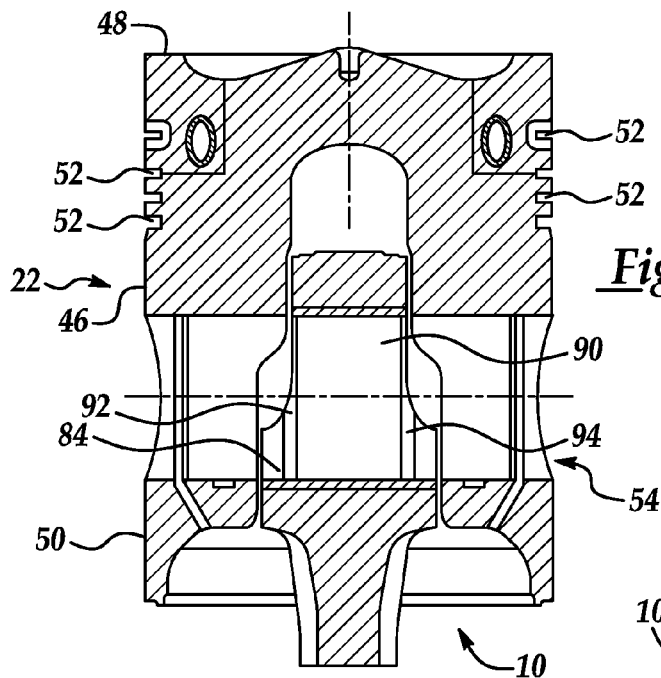
FIG. 2 is an enlarged cross-sectional view of the connecting rod assembly manufactured pursuant to the method of the present invention and shown secured to a piston.

As shown in FIG. 2, the piston 22 includes a body 46 having a crown 48 formed at the uppermost margins of the body 46 and a skirt 50 depending from the crown 48. Ring lands 52 extend about the outer circumference of the body 46 between the crown 48 and the skirt 50. The ring lands 52 are adapted to retain piston rings (not shown, but generally known in the art). The body 46 further includes a bore 54 formed therein. The bore 54 is adapted to receive the piston pin 24. The piston pin 24 is often cylindrical in shape and includes a substantially uniform diameter. This shape has been adopted as the standard for most applications. However, those having ordinary skill in the art will appreciate that the piston pin 24 may include a center area having a reduced diameter with respect to the diameter of the distal ends. Accordingly, those having ordinary skill in the art will appreciate that the bore 54 will include a shape that corresponds to the shape of the piston pin 24. Furthermore, those having ordinary skill in the art will appreciate that pistons can have many different shapes, sizes, and other structural features. By way of example, the pistons 22 may include any number of ring lands 52, or protrusions and/or recesses on the crown 48 for facilitating the combustion process and enhancing the power or efficiency derived therefrom. The piston 22 may also include recesses or grooves formed on the piston skirt 50 or a coating applied to the piston skirt 50.

As mentioned above, the connecting rod assembly 10 is adapted to interconnect the piston 22 and the crankshaft 26 so as to translate the reciprocal movement of the piston 22 into rotational movement of the crankshaft 26. To this end, the connecting rod assembly 10 includes a small end, generally indicated at 56, secured to the piston 22 via the piston pin 24 and a large or crank end 58 operatively secured to the crankshaft 26 through bolts 60. The small end 56 includes a terminal end 62 and a pin bore, generally indicated at 64, extending therethrough. The pin bore 64 is adapted to receive the piston pin 24. As described above, the piston pin 24 may include a number of different shapes which depart from the standard cylindrical shape used in most applications. Accordingly, those having ordinary skill in the art will appreciate that the pin bore 64 of the connecting rod assembly 10 will accommodate shape of piston pin 24 employed for a particular application.

Figure 3A:
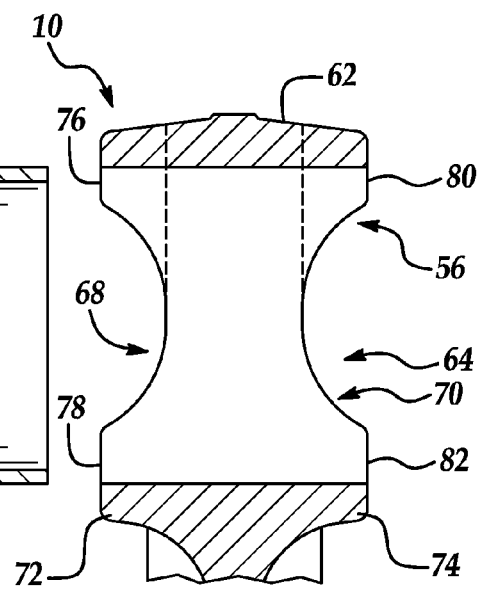
FIG. 3A is an exploded, fragmentary cross-sectional view of the small end of the connecting rod assembly with formed channels but prior to installation of a bushing and final machining, with the final machining lines shown in phantom, in accordance with the present invention.
Figure 3B:
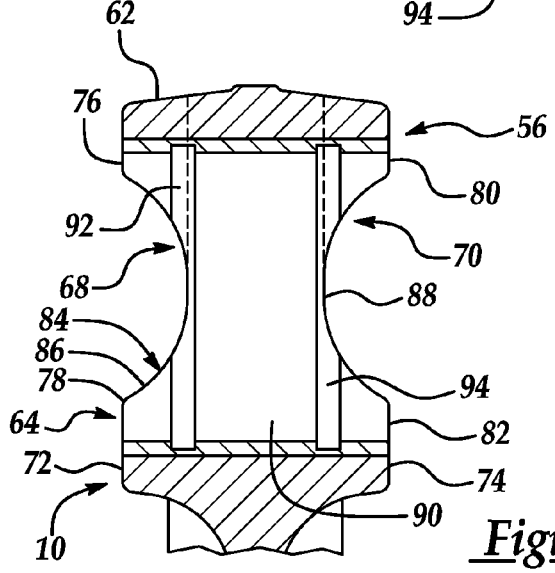
FIG. 3B is a fragmentary cross-sectional view of the small end of the connecting rod assembly after the bushing has been inserted but prior to final machining with the final machining lines shown in phantom in accordance with the present invention.

Referring to FIGS. 3A and 3B, the connecting rod assembly 10 manufactured according to the method of the present invention includes a pair of channels, generally indicated at 68 and 70, formed on opposite sides 72, 74 of the small end 56. The sides 72, 74 on which the channels 68, 70 are located are the sides through which the pin bore 64 extends, such that the axis of each of the channels 68, 70 is substantially parallel to each other and perpendicular to the axis of the pin bore 64. Each of the channels 68, 70 includes a pair of ridges 76, 78, 80, 82 on opposite sides of the pin bore 64. The ridges 76, 78 and 80, 82 for each channel 68, 70 respectively, are coplanar to reduce or eliminate any moment force that may be generated when a bushing, to be described in greater detail below, is installed into the pin bore 64, thereby reducing misalignment between the bushing and pin bore and deformation of the bushing. Additionally, the ridges 76, 78, 80, 82 reduce or eliminate any moment force that may be generated when the contact surface within the small end 56 is defined by machining or otherwise, as will be described in greater detail below.

The connecting rod assembly 10 may also include a bushing, generally indicated at 84. The bushing 84 includes a predetermined outer diameter to facilitate installation of the bushing 84 in a fixed position within the pin bore 64, as will be described in greater detail below. The bushing 84 may include predetermined contours 86, 88 which substantially correspond to the contour of the opposed channels 68, 70 respectively, as shown in FIG. 3B. On the other hand, the bushing 84 that does not have predetermined contours, as shown in FIG. 3A, may also be employed.

Referring to FIGS. 3A-6, the bushing 84 further includes a contact surface 90 that is disposed for rotational contact with the piston pin 24, thereby interconnecting the connecting rod assembly 10 to the piston 22. The contact surface 90 defines a pivot axis about which the piston pin 24 may rotate during movement of the piston 22 and connecting rod assembly 10 within the cylinder 14. To perform the desired objectives of countering high loads, facilitating load carrying capacity and resisting seizure, the bushing 84 may be constructed from a metal that is dissimilar from that of the connecting rod assembly 10, which reduces friction and scuffing that might otherwise occur between the piston pin 24 and the pin bore 64. However, those having ordinary skill in the art will appreciate that a bushing 84 constructed from a polymer may also be employed to accomplish a similar end, where the polymer material is suitable for use within an internal combustion engine 12. Further, the bushing 84 may be constructed from a rolled material or flat stock material and subsequently worked to provide the substantially cylindrical shape corresponding to the inner circumference of the pin bore 64.

The contact surface 90 of the bushing 84 further includes at least a pair of grooves 92, 94 and opposed distal ends 96, 98, as shown in FIG. 3A. Where the bushing is constructed from a flat stock material the grooves may be machined prior to working the material to correspond to the inner circumference of the pin bore 64. The grooves 92, 94 may extend for a predetermined annular extent about the contact surface 90. However, the grooves 92, 94 may also extend entirely around the circumference of the contact surface 90, as shown in FIG. 3B. In either event, the grooves 92, 94 are disposed along at least a portion of the distal ends 96, 98 (FIGS. 5A and 5B), thereby essentially eliminating the need to deburr the small end after machining to provide a reduced width configuration, as will be described in greater detail below. The grooves 92, 94 may also facilitate lubrication during engine operation to reduce friction and thermal stress at the interface between the piston pin 24 and the contact surface 90 of the bushing. Those having ordinary skill in the art will appreciate that while the grooves 92, 94 are disposed on only a portion of the distal ends 96, 98, they may be disposed along the entire distal ends.

Referring to the embodiment illustrated in FIGS. 2-5B, the small end of the connecting rod assembly 10 includes a stepped configuration. However, there exist situations where it is desirous to employ a connecting rod assembly having a reduced width design other than a stepped configuration. Accordingly, another connecting rod assembly manufactured according to the method of the present invention is generally indicated at 110 in FIG. 6 where like numerals, increased by 100 with respect to the embodiment of the invention illustrated in FIGS. 2-5B, are used to designate like structure. The connecting rod assembly 110 is similar to the connecting rod assembly 10 shown in FIGS. 2-5 and so the description of the illustrated structure will not be repeated here except where expressly mentioned below.

Figure 6:
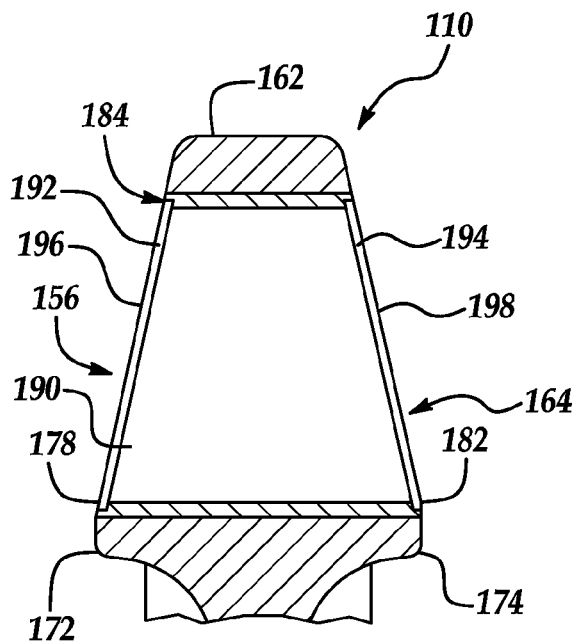
FIG. 6 is a fragmentary cross-sectional view of a small end of a connecting rod assembly having a bushing manufactured pursuant to another method of the present invention.

Referring to FIG. 6, the connecting rod assembly 110 is shown having a small end 156 including a terminal end 162 and pin bore 164 extending therethrough. In this embodiment, the small end 156 includes a trapezoidal configuration. In this embodiment, the connecting rod assembly 110 also includes a bushing, generally indicated at 184. The bushing 184 includes a predetermined outer diameter to facilitate installation in a fixed position within the pin bore 164, as described in greater detail below. The bushing 184 further includes a contact surface 190 that is disposed for rotational contact with the piston pin 24, thereby interconnecting the connecting rod assembly 110 to the piston 22.

The contact surface 190 of the bushing 184 further includes at least a pair of grooves 192, 194. The grooves 192, 194 may extend for a predetermined annular extent about the contact surface 190. However, the grooves 192, 194 may extend entirely around the circumference of the contact surface 190, as shown in FIG. 6. In either event, at least a portion of the grooves 192, 194 are disposed along the distal ends 196, 198 to essentially eliminate the need to deburr the small end 156 of the connecting rod assembly 110 after machining to create the trapezoidal configuration, as described in greater detail below. As further shown in FIG. 6, the grooves are annularly disposed along the entire circumference of the distal ends 196, 198. The grooves 192, 194 may also direct lubrication during engine operation to reduce friction and thermal stress at the interface between the piston pin 24 and the contact surface 190 of the bushing 184.

In the embodiments illustrated in FIGS. 2-6, the connecting rod assembly 10, 110 includes a bushing 84, 184. However, there exist situations where it is desirous to employ a connecting rod assembly without a bushing 84, 184. Accordingly, another connecting rod assembly manufactured according to the method of the present invention is generally indicated at 210 in FIG. 7 where like numerals, increased by 200 with respect to the embodiment of the invention illustrated in FIGS. 2-5B, are used to designate like structure. The connecting rod assembly 210 is similar to the connecting rod assembly 10 shown in FIGS. 2-5B and so the description of the illustrated structure will not be repeated here except where expressly mentioned below.

Figure 7:
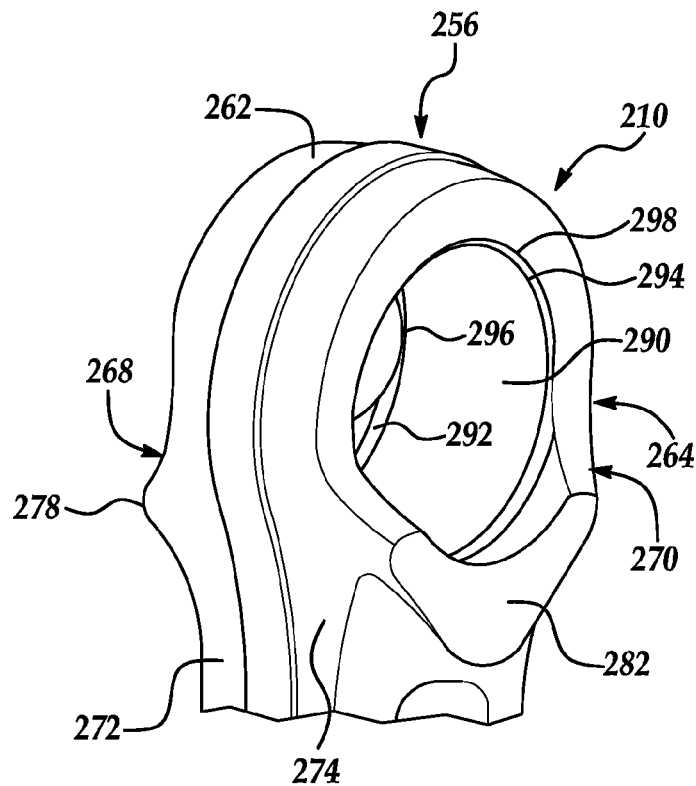
FIG. 7 is a fragmentary perspective view of yet another embodiment of the small end of the connecting rod assembly manufactured pursuant to yet another method of the present invention.

Referring to FIG. 7, the connecting rod assembly 210 is shown having a small end 256 including a terminal end 262 and pin bore 264 extending therethrough. In this embodiment, the inner circumference of the pin bore 264 is substantially cylindrical. However, those having ordinary skill in the art will appreciate that the inner circumference of the pin bore 264 may also define a number of other shapes. By way of example, the inner circumference of the pin bore 264 may be substantially oval or include a tapered profile to accommodate a particular style of piston pin 24. The pin bore 264 further includes a contact surface 290 operatively engaged by the piston pin 24, thereby interconnecting the connecting rod assembly 210 to the piston 22. The contact surface 290 is defined to provide a pivot surface between the connecting rod assembly 210 and the piston pin 24 to facilitate smooth linear and rotational movement of same within the cylinder 14 during engine 12 operation. The contact surface 290 includes at a pair of grooves 292, 294 and opposed distal ends 296, 298. The grooves 293, 294 may extend for a predetermined annular extent about the contact surface 290. However, the grooves may also extend entirely around the circumference of the contact surface 290, as shown in FIG. 7. In either event, at least a portion of the grooves 292, 294 are disposed along the distal ends 296, 298, thereby essentially eliminating the need to deburr the small end 256 of the connecting rod assembly 210 after machining to create the reduced width configuration, as described in greater detail below. The grooves 292, 294 may also direct lubrication during engine operation to reduce friction and thermal stress at the interface between the piston pin 24 and the contact surface 290. While the embodiment of the connecting rod assembly 210 shown in FIG. 7 includes a small end 256 having a stepped configuration, those having ordinary skill in the art will appreciate the small end 256 of the connecting rod assembly 210 may also have a trapezoidal configuration.

Referring to FIGS. 3A-5B, the method of manufacturing the connecting rod assembly 10 of the present invention includes defining the small end 56 of the connecting rod having a terminal end 62. The small end 56 may be defined by any suitable process known in the art. By way of example, the small end 56 may be defined via forging, casting or powder metallurgy. A pin bore 64 is also defined at the small end 56 may be preliminarily formed during this initial step of forging, casting, or powder metallurgy and later finish machined into the small end 56.

Where forging is employed, the step of defining the small end 56 includes heating a metal blank in to temperature where the metal may be pressed, stamped, or pounded into a predetermined form. The metal blank may then be placed into a die cavity having a predetermined form and subsequently forged to correspond to the predetermined form of the die cavity. Where casting is employed, the step of defining the small end 56 includes pouring molten metal into a mold cavity having a predetermined form and allowing the molten metal to cool to conform to the predetermined form of the mold cavity. Where powder metallurgy is employed, the step of defining the small end 56 includes compressing a metal powder within a die cavity to define a predetermined form and sintering the compressed powder to bond and conform the powder metal to the predetermined form of the die cavity. Those having ordinary skill in the art will appreciate that the connecting rod assembly 10 may also be machined from metal stock.

Once the small end 56 is defined, the method of the present invention includes forging a pair of channels 68, 70 on opposite sides 72, 74 of the small end 56 such that the axis of each of the channels 68, 70 is perpendicular to the axis of the pin bore 64. Those having ordinary skill in the art will appreciate that where the forging process is employed to define the small end 56, the channels 68, 70 may be simultaneously forged therewith. Further, where casting or powder metallurgy is employed to define the small end 56, the channels 66, 68 may be incorporated during either of these processes.

The method of manufacture further includes forming a bushing 84 having a contact surface 90 including at least partially annular grooves 92, 94. The bushing 84 may be formed by any conventional method which may include the methods described above to define the small end 56 of a connecting rod 10. Accordingly, the above-identified methods are incorporated by reference herein relative to forming the bushing 84. Further, rather than forming the bushing 84 by casting, forging, machining or power metallurgy, the material for the bushing 84 may be cast, forged or machined as flat stock and subsequently shaped to conform to the circumference of the pin bore 64. Regardless of the process employed to form a bushing, the grooves 92, 94 may be machined, stamped, or otherwise defined within the bushing prior to shaping machining the small end to provide a reduced width configuration, as will be described in greater detail below. By way of example, where a flat stock material is employed, the grooves 92, 94 may be formed therein prior to working the material to conform to the circumference of the pin bore 64.

A bushing 84 is then installed into the pin bore 64 of the small end 56. The bushing 84 is positioned in relative proximity to the pin bore 64 such that the axis of the pin bore 64 and the axis of the bushing 84 are substantially aligned. Specifically, the bushing 84 is positioned adjacent the ridges 76, 78 or 80, 82 of a channel 68 or 70, respectively, and inserted into the pin bore 64 until the bushing 84 is substantially centered within in the pin bore 64. Insertion occurs by mechanically pressing the bushing 84 into the pin bore 64 to provide an interference fit between the bushing 84 and the pin bore 64, thereby maintaining the bushing 84 in a fixed position relative to the pin bore 64. In order to provide the interference fit between the bushing 84 and the pin bore 64, the outer diameter of the bushing 84 vary within micrometers relative to the inner diameter of the pin bore 64. However, the difference in diameters may not be so great as to compromise the fixed position of the bushing 84 relative to the pin bore 64 necessary during engine 12 operation.

The bushing 84 may also be installed into the pin bore 64 by creating a temperature differential between the bushing 84 and the small end 56. Accordingly, heating the small end 56 to provide thermal expansion of the pin bore 64 or cooling the bushing 84 to provide thermal contraction, or both, will affect the desired temperature differential and assist in the installation process. Specifically, under the effected temperature differential, the outer diameter of the bushing 84 will reduce and the inner diameter of the pin bore 64 will expand, thereby enabling the bushing 84 to be inserted within the pin bore 64. Upon achieving temperature equilibrium between the two components, the bushing 84 is fixed within the pin bore 64. Those having ordinary skill in the art will appreciate that the above-identified methods of installing a bushing 84 into a pin bore 64 are exemplary and that the step of installing a bushing 84 within a pin bore 64 may be accomplished by several different methods.

Figure 4:
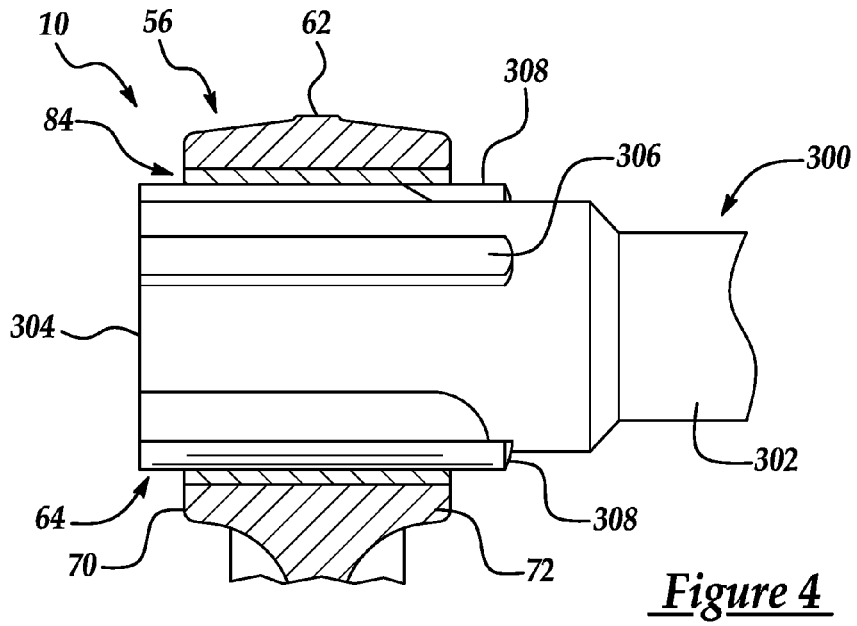
FIG. 4 is a fragmentary cross-sectional view of the small end of the connecting rod assembly and illustrating a machining tool to define a contact surface in the small end that engages a piston pin manufactured pursuant to the method of the present invention.

Once the bushing 84 is installed into the pin bore 64, a contact surface 90 is defined within the small end 56. Referring to FIGS. 4-5B, a machining tool, generally indicated at 300, engages the inner circumference of the bushing 84 to define the contact surface 90 which facilitates smooth rotational movement of the piston pin 24 during engine 12 operation. As shown in FIG. 4, the machining tool 300 includes a rotary driven shaft 302 and a cutting head 304. The cutting head 304 includes a plurality of pads 306 which support the cutting head 304 during rotational movement within the pin bore 64. The cutting head 304 further includes a plurality of cutting faces 308 that define the contact surface 90. As a result of the channels 68, 70 and the ridges 76, 78 and 80, 82 formed therefrom, the machining tool 300 will finish machine the contact surface 90 to the appropriate inner diameter for a particular application without incurring the moment forces associated with finish machining the contact surface of a small end having a reduced width upper region with respect to the remaining portion of the small end. Those having ordinary skill in the art will appreciate that the contact surface 90 may be defined by any suitable machining tools, such as a CNC machine or other type of cutting tool suitable for defining a contact surface 90 within the small end 56 of a connecting rod assembly 10.

Figure 5A:
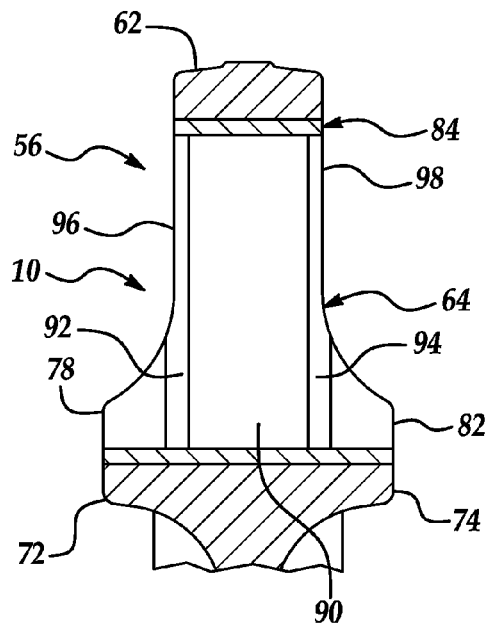
FIG. 5A is a fragmentary cross-sectional view of the small end of the connecting rod assembly manufactured pursuant to the method of the present invention.
Figure 5B:
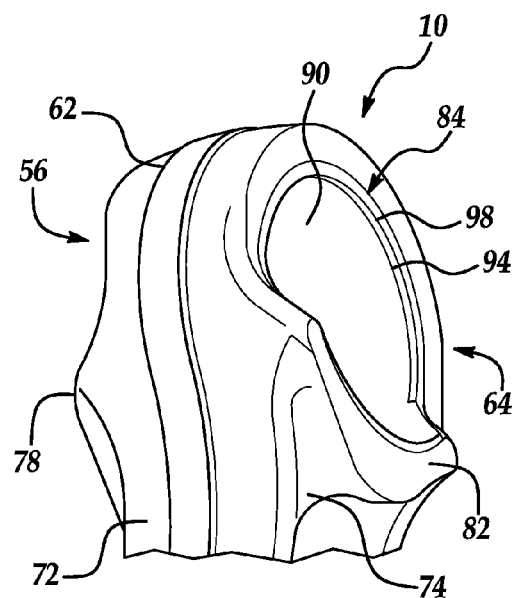
FIG. 5B is a fragmentary perspective view of the small end of the connecting rod assembly of FIG. 5A manufactured pursuant to the method of the present invention.

The small end 56 of the connecting rod assembly 10 is subsequently machined to reduce the width between each channel 68, 70 and the terminal end 62, thereby providing a stepped configuration (FIGS. 5A and 5B). Specifically, the small end 56 is machined to remove a predetermined portion between the ridges 78, 82 of each channel 68, 70 and the terminal end 62. Thus, this machining step acts to substantially remove the ridges 76, 80. Whether the bushing is a conventionally shaped bushing or it includes predetermined contours 86, 88 corresponding to the contour of the channels 68, 70, as described with respect to FIGS. 3A and 3B above, a predetermined amount of the bushing 84 is also removed during the machining of the small end 56 to provide the stepped configuration.

In particular, during machining of the small end 56, a predetermined amount of the bushing 84 is removed such that the grooves 92, 94 are disposed along at least a portion of the distal ends 96, 98. Where at least a portion of the grooves 92, 94 are disposed along the distal ends 96, 98 the need for the small end 56 of the connecting rod 10 to undergo a subsequent deburring process is essentially eliminated.

Similarly, the embodiment of the connecting rod assembly shown in FIG. 6 may be manufactured according to the method described above with reference to FIGS. 3A-5B. However, the step of machining the small end of the connecting rod assembly to provide a stepped configuration is replaced by machining the small end to provide a trapezoidal configuration. Specifically, the small end 156 is machined to remove a predetermined portion between the ridges 178, 182 and the terminal end 162, thereby substantially removing the ridges 176, 180. Accordingly, by machining the small end 156 of the connecting rod assembly 110 to provide a trapezoidal configuration, at least a portion of the grooves 192, 194 are disposed along the distal ends 196, 198. Alternatively, where a particular application of the connecting rod assembly 110 requires a more pronounced trapezoidal configuration, the small end 156 may be machined to remove a predetermined portion of the ridges 178, 180 as well as the ridges 176, 182 to provide the desired trapezoidal configuration. This alternative method would provide the same advantages of essentially eliminating moment forces during installation of the bushing 184 and final machining of the contact surface 190 as well as essentially eliminating the need for a deburring process as at least a portion of the grooves 192, 194 are disposed along the distal end 196, 198. As shown in FIG. 6, the grooves extend entirely around the distal ends 196, 198.

Referring to the embodiment of the present invention shown in FIG. 7, the connecting rod assembly 210 is manufactured according to an alternative method of manufacture to that described with respect to FIGS. 3-6. While similar to the method of manufacture described with respect to FIGS. 3-6, the connecting rod assembly 210 shown in FIG. 7 does not include a bushing 84, 184. Rather, the pin bore 264 of the small end 256 includes at least partially annular grooves 292, 294 adjacent the distal ends 296, 298 of the pin bore 264. The method of manufacture represented by the embodiment illustrated in FIG. 7 includes defining a small end 256 of a connecting rod 210 having a terminal 262 and defining a pin bore 264 extending through the small end 256. The small end 256 may be defined by any suitable process known in the art such as forging, casting or powder metallurgy, as described above relative to FIGS. 3A-6 is incorporated by reference herein. The pin bore 264 defined at the small end 256 may also be formed during the initial step of forging, casting, or powder metallurgy or may be later machined into the small end 256.

The method of manufacturing the connecting rod assembly 210 further includes forming a pair of channels 268, 270 on opposite sides 272, 274 of the small end 256 such that the axis of each of the channels 268, 270 is perpendicular to the axis of the pin bore 264 as described relative to FIGS. 3-5B and incorporated by reference herein. At least partially annular grooves 292, 294 are also formed along the contact surface 290 of the pin bore 264 adjacent the distal ends 296, 298. Alternatively, the grooves 292, 294 may be machined into the contact surface 290 in a subsequent step once the small end 256 is defined. However, those having ordinary skill in the art will appreciate that where the forging process is employed to define the small end 256, the grooves 290, 292 may be simultaneously forged therewith. Further, where casting or powder metallurgy is employed to define the small end 256, the grooves 290, 292 may be incorporated during either of these processes and subsequently machined to proper specifications for the desired application.

The small end 256 of the connecting rod assembly 210 is then machined to reduce the width between each channel 268, 270 and the terminal end 262, to provide a stepped configuration as described with reference to the embodiment shown in FIGS. 3A-6. Specifically, during machining of the small end 256, a predetermined amount of the pin bore 264 is removed such that at least a portion of the grooves 292, 294 are disposed along the opposed ends of the pin bore 264. Where at least a portion of the grooves 292, 294 are disposed along the opposed ends of the pin bore 264, the need for the small end 256 of the connecting rod 210 to undergo a subsequent deburring process is essentially eliminated.

The reduced width configuration, shown throughout the figures, reduces weight and improves lubrication between the connecting rod assembly 10 and the piston 22 to counter the high loads, temperature, gas pressure and inertial forces localized at this area. In the absence of such heightened properties, the piston 22 and connecting rod assembly 10 may scuff and ultimately fail. Likewise, it is important to ensure that the pivot point between the piston 22, connecting rod assembly 10 and piston pin 24 remains resistant to thermal stress and load fatigue while maintaining good friction and wear resistant properties during operation of the engine 12.

Accordingly, the method of the present invention overcomes the disadvantages of the related art and improves the installation of a bushing into a pin bore of a connecting rod having a reduced width, small end thereby prolonging the life of the relative components of an internal combustion engine without undue wear resulting in "out of tolerance" conditions. Further, the pair of channels on opposite sides of the small end provide a coplanar area adjacent the pin bore that acts to reduce the moment forces generated when installing the bushing into the pin bore. This reduces the likelihood of deforming the bushing and creating an irregular contact area between the bushing, the pin bore, as well as between the bushing and the piston pin. The method of the present invention produces a connecting rod having a reduced weight by reducing the width of the small end. Further, the method of the present invention reduces the cost of manufacturing by reducing the need for inspection of improper bushing installation within the small end caused by moment force.

To further over come the disadvantages of the related art, the method of the present invention improves lubrication and streamlines manufacturing by providing at least partially annular grooves along the contact surface within the small end of the connecting rod assembly. In particular, the grooves are disposed adjacent the distal ends of the small end of the connecting rod assembly. As a result of machining of the small end, to provide a reduced width configuration, at least a portion of the each groove is then disposed along a distal end of the small end of the connecting rod assembly. In this manner, the need to subsequently deburr the machined area of the small end is greatly reduced, thereby streamlining the manufacturing process. Lubrication along the pivot point between the small end and the piston pin is also improved as a result of the location of the grooves after machining to provide the reduced width configuration.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A method of manufacturing a connecting rod assembly for use within an internal combustion engine comprising the steps of:
   compressing metal powder within a die cavity defining the predetermined form;
   sintering the compressed powder to bond and conform to the predetermined form of the die cavity such that the metal powder is shaped into a connecting rod; and
   removing the connecting rod from the mold cavity;
   defining a pin bore extending through the small end of the connecting rod and forming a pair of channels on opposite sides of the small end of the connecting rod wherein the axis of each of the channels is substantially perpendicular to the axis of the pin bore;
   forming a bushing having a contact surface including at least partially annular grooves disposed thereon and opposed distal ends;
   installing a bushing into the pin bore of the small end and;
   machining the connecting rod to reduce the width of the small end between each channel and the terminal end, wherein at least a portion of the grooves are disposed along the distal ends to reduce the need to deburr the area adjacent the pin bore.

2. The method as set forth in claim 1 wherein the step of forming a bushing further includes defining predetermined contours within the opposed distal ends substantially corresponding to the channels of the small end of the connecting rod assembly.

3. The method as set forth in claim 1 wherein the step of installing a bushing further includes the steps of:

heating the small end of the connecting rod assembly to provide thermal expansion of the pin bore to a predetermined diameter greater than the predetermined outer diameter of the bushing and;

cooling the bushing to contract the bushing to a predetermined diameter less than the predetermined diameter of the small end pin bore.

4. The method as set forth in claim 3 wherein the step of installing a bushing further includes the steps of:

positioning the bushing in relative proximity to the pin bore of the small end such that the axis of the pin bore and the axis of the bushing substantially align;

inserting the bushing into the small end pin bore until the bushing is substantially centered within the small end pin bore; and affecting a temperature equilibrium between the connecting rod assembly and the bushing to secure the bushing within the small end pin bore of the connecting rod assembly.

5. The method as set forth in claim 1 wherein the step of installing a bushing further includes the steps of:

positioning the bushing in relative proximity to the pin bore of the small end such that the axis of the pin bore and the axis of the bushing substantially align; and inserting the bushing into the small end pin bore until the bushing is substantially centered within the small end pin bore.

6. The method as set forth in claim 1 wherein said method further includes the step of machining the bushing to define a contact surface within the small end of the connecting rod assembly that operatively engages a piston pin prior to the step of machining the connecting rod assembly to reduce the width of the small end between each channel and the terminal end.

7. The method as set forth in claim 1 wherein the step of machining the connecting rod assembly further includes the step of removing a predetermined amount of material of the connecting rod assembly between the pin bore and the terminal end of the small end to provide a stepped configuration along the small end of the connecting rod assembly where the grooves are disposed along at least a portion of the distal ends.

* * * * *